United States Patent
Pierce et al.

(10) Patent No.: US 7,066,515 B2
(45) Date of Patent: Jun. 27, 2006

(54) DEFORMABLE COMPONENT CARRIER

(75) Inventors: Eric J. Pierce, Troy, MI (US); Eric A. Mathieson, Rochester, MI (US); Krishnarao V. Yalamanchili, Ann Arbor, MI (US); Terry A. Swartzell, Ann Arbor, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/961,692

(22) Filed: Oct. 8, 2004

(65) Prior Publication Data

US 2006/0076800 A1    Apr. 13, 2006

(51) Int. Cl.
*B60R 13/00* (2006.01)
(52) U.S. Cl. .................. 296/21; 296/187.03; 180/68.5
(58) Field of Classification Search ........... 296/187.11, 296/187.03, 204
See application file for complete search history.

(56) References Cited

U.S. PATENT DOCUMENTS

| | | | | |
|---|---|---|---|---|
| 3,794,348 A * | 2/1974 | Fischer | ...................... | 280/784 |
| 3,912,295 A * | 10/1975 | Eggert, Jr. | ................... | 293/133 |
| 3,983,962 A * | 10/1976 | Torke | ......................... | 293/133 |
| 4,194,763 A * | 3/1980 | Reidelbach et al. | ... | 296/187.03 |
| 4,267,895 A * | 5/1981 | Eggert, Jr. | ............. | 296/187.09 |
| 4,684,151 A * | 8/1987 | Drewek | .................. | 296/187.03 |
| 5,431,445 A * | 7/1995 | Wheatley | ............... | 296/187.03 |
| 5,476,151 A * | 12/1995 | Tsuchida et al. | ........... | 180/274 |
| 5,562,178 A * | 10/1996 | Worden et al. | ............ | 180/65.1 |
| 5,639,571 A * | 6/1997 | Waters et al. | .............. | 180/68.5 |
| 5,681,057 A * | 10/1997 | Whirley et al. | ........ | 296/187.09 |
| 5,760,569 A * | 6/1998 | Chase, Jr. | ................... | 320/104 |
| 6,231,097 B1 | 5/2001 | Schell et al. | ............... | 296/37.2 |
| 6,494,279 B1 * | 12/2002 | Hutchens | ................... | 180/68.5 |
| 6,632,560 B1 * | 10/2003 | Zhou et al. | ............... | 180/68.5 |
| 6,662,891 B1 * | 12/2003 | Misu et al. | ................. | 180/65.1 |
| 6,736,229 B1 * | 5/2004 | Amori et al. | .............. | 180/68.5 |
| 6,766,873 B1 * | 7/2004 | Chernoff et al. | ........... | 180/65.1 |
| 6,808,229 B1 * | 10/2004 | Yamaguchi | ................. | 296/204 |
| 6,820,924 B1 * | 11/2004 | Caliskan et al. | ....... | 296/187.03 |

* cited by examiner

*Primary Examiner*—Kiran B. Patel
(74) *Attorney, Agent, or Firm*—Laura C. Hargitt

(57) ABSTRACT

A carrier for use in supporting a component in a vehicle structure in accordance with the present invention includes at least a pair of side rails each having a first end and an opposed second end. The first and second ends of the side rails are attached to the vehicle structure, and each side rail includes a predetermined bending location at a predetermined location between the first and second ends. The component is adapted to be attached to the side rails intermediate the predetermined bending location and the first end. The side rails are operable to bend about the predetermined bending location when an impact load is applied to the first end of the side rails.

19 Claims, 4 Drawing Sheets

DEFORMABLE COMPONENT CARRIER

BACKGROUND OF THE INVENTION

The present invention relates generally to automotive vehicle structures and, in particular, to a deformable component carrier for supporting a component in a vehicle structure.

Certain portions of the structure of automobile vehicles are designed to crush in order to absorb energy during a crush event, i.e., when a force exceeding a predetermined value is applied to the vehicle structure. As new and different components are mounted to the vehicle structure, these components must be accounted for in the design of the vehicle structure in the case of a crush event.

It is desirable, therefore, to provide a carrier that supports a component and allows the vehicle structure to absorb energy in a normal manner during a crush event.

SUMMARY OF THE INVENTION

The present invention concerns a carrier for use in supporting a component in a vehicle structure. The carrier includes at least a pair of side rails each having a first end and an opposed second end. The first and second ends of the side rails are attached to the vehicle structure, and each side rail includes a predetermined bending location at a predetermined location between the first and second ends. The component is adapted to be attached to the side rails intermediate the predetermined bending location and the first end. The side rails are operable to bend about the predetermined bending location when an impact load is applied to the first end of the side rails.

Preferably, the side rails are sacrificial side rails and the carrier includes a cross member attached to each of the first ends of the side rails. Preferably, the carrier includes a perimeter rail assembly attached to the side rails intermediate the predetermined bending location and the first end that is adapted to support the component. The perimeter rail assembly is particularly advantageous for mounting those components that require additional vertical support during a crush event or the like and where it is not desirable for the component to sustain any crush itself during the crush event. The component may be, but is not limited to, a fuel cell, a high voltage hybrid vehicle battery, or the like.

In operation, when a force, such as a vehicle impact or the like, is applied to the cross member or the first ends of the carrier, the side rails bend about the predetermined bending location and lift the component up and away from the crush event.

The carrier in accordance with the present invention allows a component to be attached to a vehicle, such as to a vehicle frame rail or the like, and allows the vehicle frame rail to function as intended during a rear impact or crush event without requiring extensive redesign of the properties of the frame rail. The carrier allows the frame rail to crush while moving the component out of the direction of the crush.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
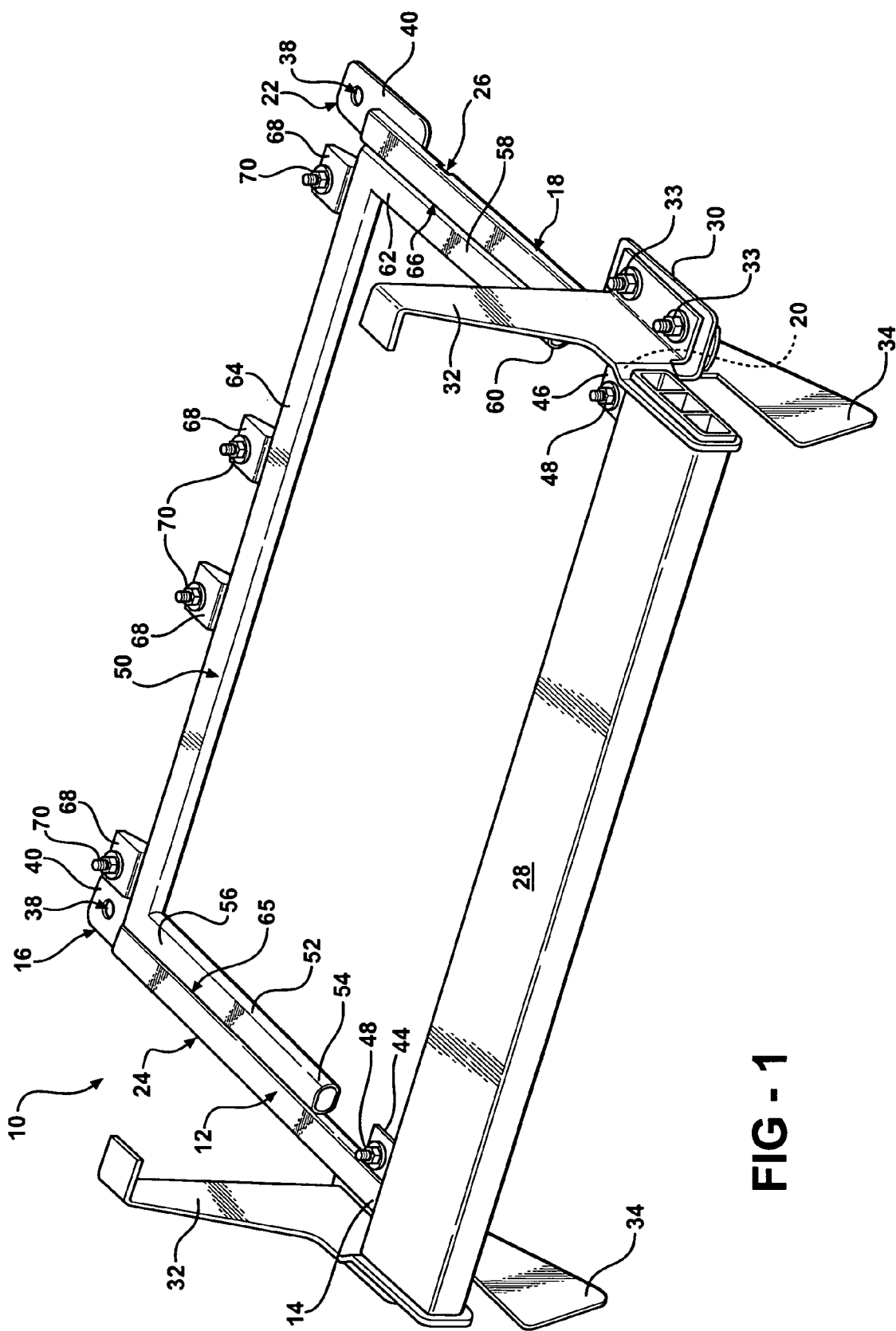
FIG. 1 is a perspective view of an carrier in accordance with the present invention.

Referring now to FIGS. 1–4, a carrier in accordance with the present invention is indicated generally at 10. The carrier 10 includes a first side rail 12 having a first end 14 and an opposed second end 16 and a second side rail 18 having a first end 20 and an opposed second end 22. The side rails 12 and 18 are preferably substantially equal in length and are constructed of a high strength steel, a high strength steel alloy, or similar high strength material and are preferably formed tubular in cross section to reduce the overall weight of the rails 12 and 18. The first side rail 12 includes a predetermined bending location, indicated generally at 24, intermediate the first end 14 and the second end 16 thereof. The second side rail 18 includes a predetermined bending location, indicated generally at 26, intermediate the first end 20 and the second end 22 thereof. The distance between the first end 14 and the predetermined bending locations 24 is preferably equal to the distance between the first end 20 and the predetermined bending location 26 but this may vary depending on the shape and orientation of the particular component, discussed in more detail below, being mounted thereto. The predetermined bending locations 24 and 26 are preferably structural notches formed in a lower surface of the respective side rails 12 and 18, best seen in FIG. 2. The predetermined bending locations 24 and 26 preferably define an arcuate-shaped notch in the lower surface of the rails 12 and 18. The predetermined bending locations 24 may also define any other shape advantageous for bending the rails 12 and 18 in the desired manner during a crush event, discussed in more detail below. The notch defines a lower strength or weakened cross sectional area of the rails 12 and 18, which allow the rails 12 and 18 to bend about the bending locations 24 and 26, discussed in more detail below.

A cross member 28 extends between and is fixedly attached at opposing ends thereof to the respective first ends 14 and 20 of the side rails 12 and 18. The cross member 28 is preferably constructed of high strength steel, a high strength steel alloy, or similar high strength material and is preferably formed tubular in cross section to reduce the overall weight of the cross member 28. The cross member 28 is preferably fixedly attached to the respective first ends 14 and 20 of the side rails 12 and 18 by welding or other robust attachment means known to those skilled in the art. The cross member 28 includes a pair of outwardly extending flanges 30 formed integrally with and extending outwardly from the opposing ends of the cross member 28. The flanges 30 are each adapted to attach the opposing ends of the cross member 28 to a vertical support member 32 on an upper surface thereof, such as with the use of fasteners or bolts 33 extending through apertures (not shown) formed in the flanges 30 and the vertical support member 32. The vertical support members 32 provide lateral support to a component 42, best seen in FIGS. 2–4, when the component 42 is attached to the carrier 10, discussed in more detail below. A pair of downwardly extending frame attachment members 34 are attached to a lower surface of the flanges 30, such as with the use of fasteners or bolts extending through apertures (not shown) formed in the flanges 30 and the frame attachment members 34. Preferably, the bolts 33 are utilized to attach both the vertical support members 32 and the frame attachment members 34 to the flanges 30. A free end of each of the frame attachment members 34 is adapted to be welded to a vehicle frame rail 36 (or other vehicle structure that may crush during a crush event), best seen in FIGS. 2 and 3.

Figure 2:
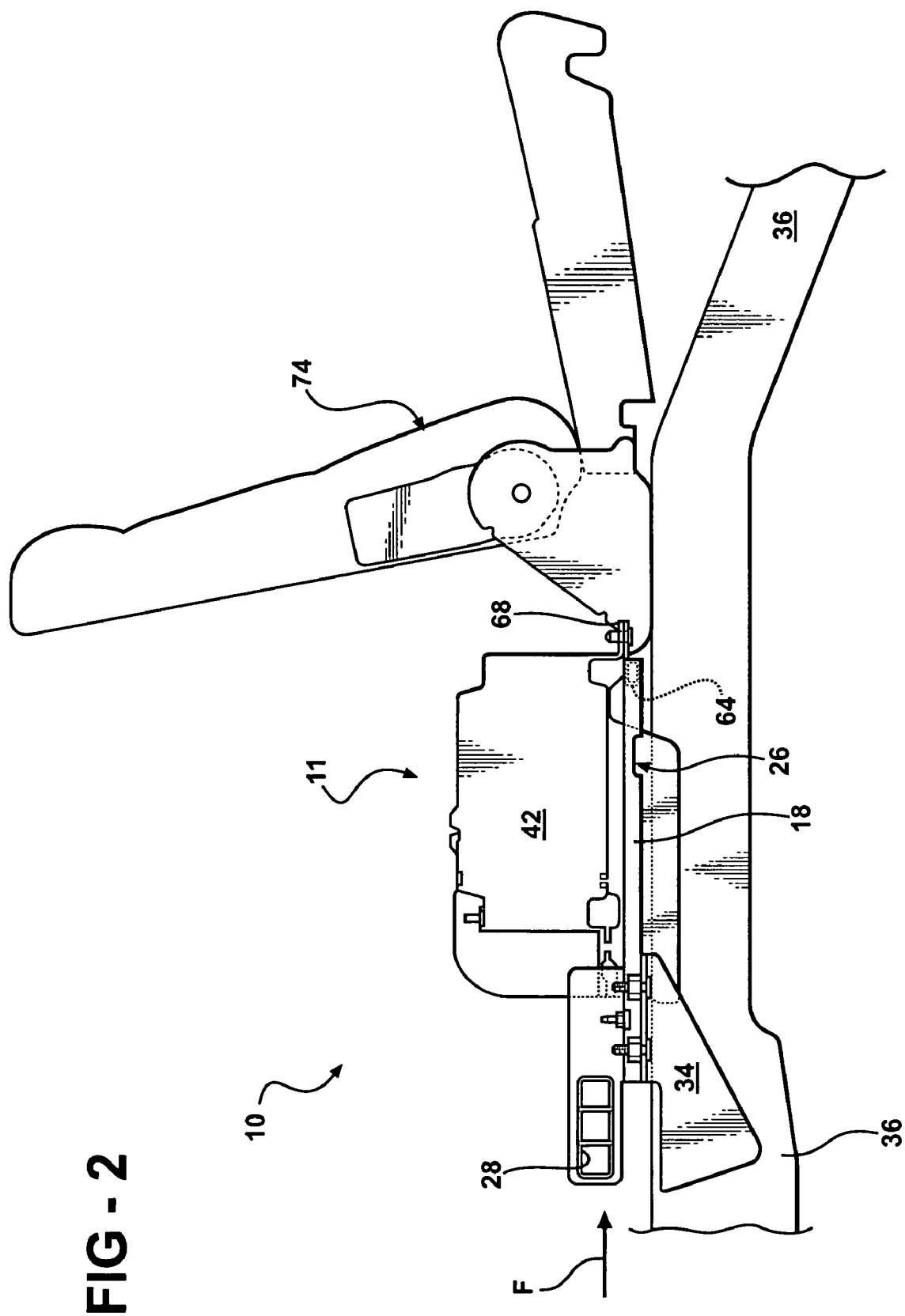
FIG. 2 is a side view of the carrier of FIG. 1 shown mounted to a vehicle frame and with a component attached thereto in an undeformed position.
Figure 3:
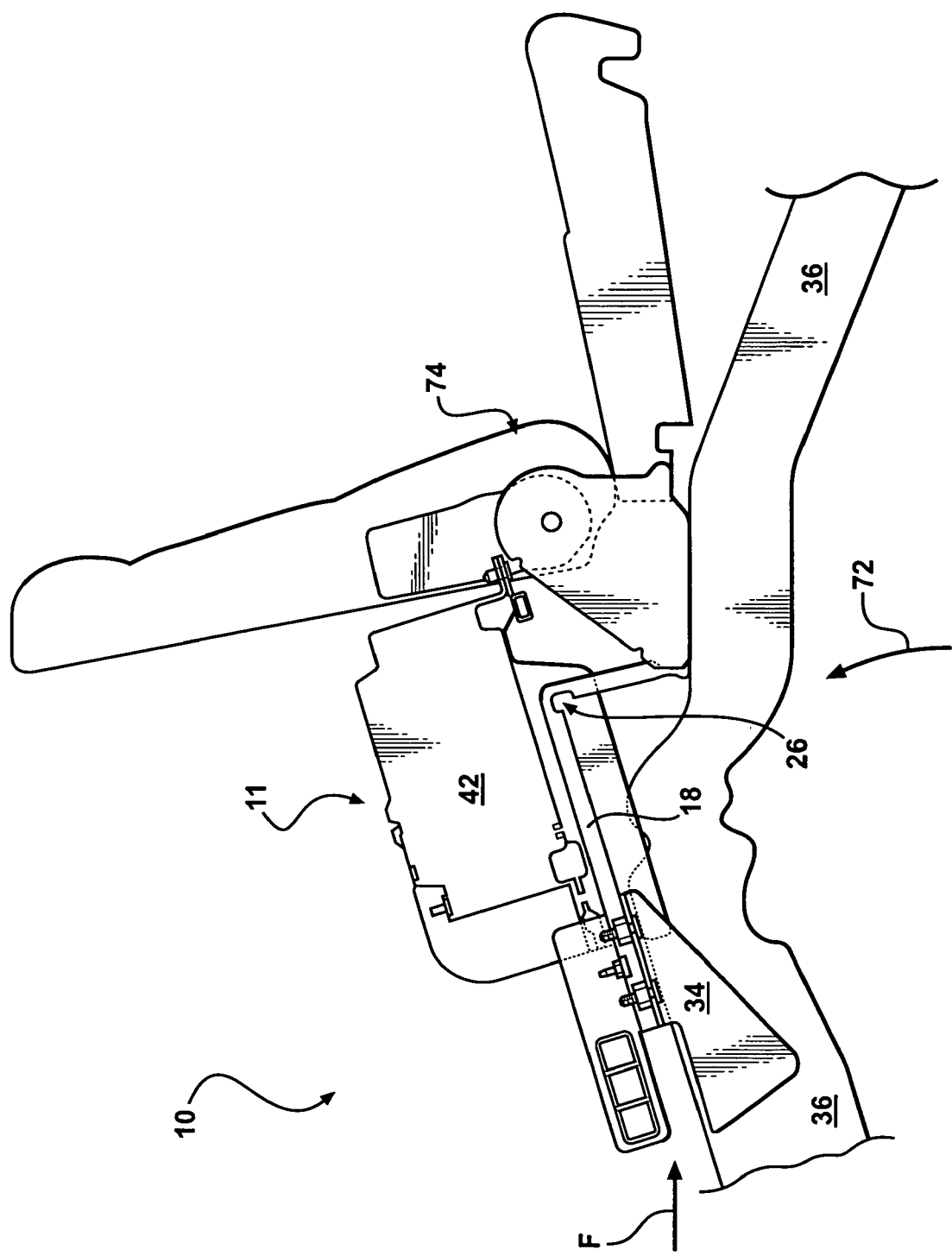
FIG. 3 is a side view of the apparatus, component, and vehicle frame of FIG. 2 shown in an deformed position after a crush event.

The second ends 16 and 22 of the side rails 12 and 18 are each adapted to be attached to a vehicle body, such as to the vehicle frame rail 36, and best seen in FIGS. 2 and 3. Preferably, the second ends 16 and 22 are rigidly attached to the vehicle frame rail 36, such as by bolts (not shown) extending through apertures 38 formed in a flange 40, best seen in FIG. 1, on the second ends 16 and 22, by welding or other attachment or fastening means known to those skilled in the art.

Figure 4:
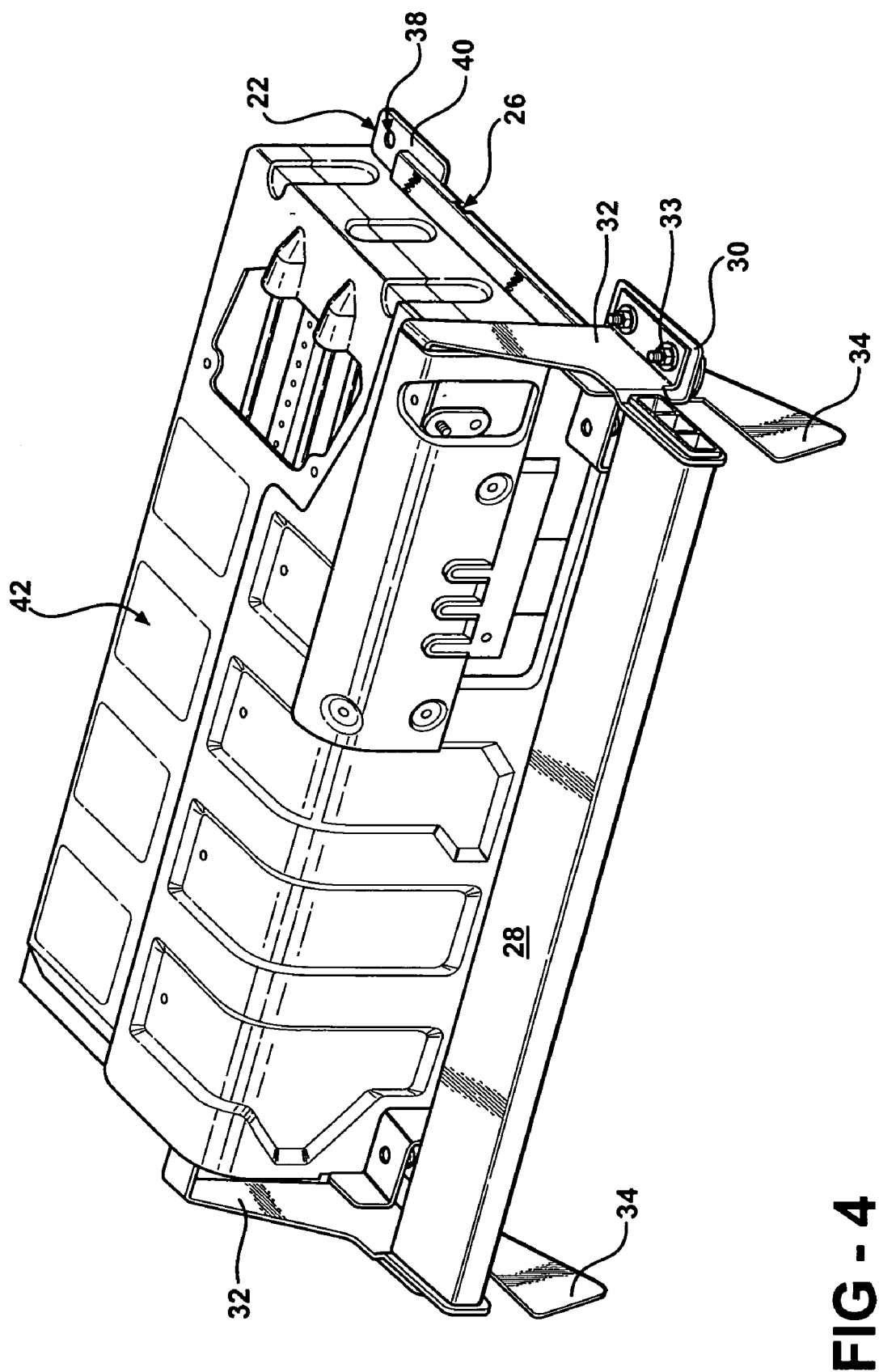
FIG. 4 is a perspective view of the apparatus of FIG. 1 shown with a component attached thereto.

The component 42, best seen in FIGS. 2–4, is adapted to be attached to the side rails 12 and 18. The component 42 may be a high voltage battery for a hybrid electric vehicle, a fuel cell, or any other component that is desirable to move from the path of a crush event of the vehicle. The component 42 is adapted to be supported by or attached to the side rails 12 and 18 intermediate the predetermined bending location 24 and the first end 14 and intermediate the predetermined bending location 26 and the first end 20, respectively. The component 42 is attached to the side rails at a rear attachment point 44 adjacent the first end 14 of the first side rail 12 and a rear attachment point 46 adjacent the first end 20 of the second side rail 18. The attachment points 44 and 46 are preferably inwardly extending flanges having apertures (not shown) extending therethrough for receiving a fastener such as a bolt 48 or the like to secure the component 42 thereto.

The carrier 10 preferably includes a perimeter rail assembly, indicated generally at 50. The perimeter rail assembly 50 includes a first side support 52 having a rearward end 54 and a forward end 56, a second side support 58 having a rearward end 60 and a forward end 62, and a transverse front support 64 connecting the first side support 52 and the second side support 58 adjacent the forward end 56 and the forward end 62. The first side support 52, the second side support 58, and the transverse front support 64 are preferably constructed of high strength steel, a high strength steel alloy, or similar high strength material and are preferably formed tubular in cross section to reduce the overall weight of the perimeter rail assembly 50. The transverse front support 64 is preferably attached to the first side support 52 and the second side support 58 by welding or similar attachment known to those skilled in the art. The rail assembly 50 is adapted to be attached to the carrier 10 rearward of the predetermined bending locations 24 and 26, such as by welding the first side support 52 to the first side rail 12 between the rearward portion 54 to a location 64 adjacent the predetermined bending location 24 and welding the second side support 58 to the second side rail 18 between the rearward portion 60 to a location 66 adjacent the predetermined bending location 26. The perimeter rail assembly 50 includes a plurality of forward attachment locations 68 for attaching the component 42 to the perimeter rail assembly 50. The attachment points 68 are preferably forwardly extending flanges having apertures (not shown) extending therethrough for receiving a fastener such as a bolt 70 or the like to secure the component 42 thereto.

In operation, the forward end of the carrier 10 is attached to the vehicle frame rail 36 at the second ends 16 and 22 of the side rails 12 and 18, and the rear end of the carrier 10 is attached to the vehicle frame rail 36 at the frame attachment members 34. The component 42 is attached to the carrier 10 at the rear attachment points 44 and 46. A forward portion of the component 42 is then placed on or attached to an upper surface of the side rails 12 and 18 or attached to the forward attachment points 68 of the perimeter rail assembly 50. The component 42 and the carrier 10, when attached, form a carrier assembly, indicated generally at 11.

During operation of the vehicle, a force, indicated by an arrow F in FIGS. 2 and 3, is applied to the vehicle frame rail 36, such as during a rear impact event or the like. The force F is transferred from the vehicle frame rail 36 to the cross member 28 through the frame attachment members 34 and to the side rails 12 and 18 through their respective fixed connections to the cross member 28. If the force F is greater than a predetermined value (i.e., a force sufficient to initiate a crush event), the vehicle frame rail 36 begins to buckle, crumple, or crush, best seen in FIG. 3, and the length of the vehicle frame rail 36 begins to shorten from the end adjacent the cross member 28. The design of the vehicle frame rail 36 is such that it will shorten or crush a predetermined distance based on the amount of energy of the force F and reduce the amount of the force F that is transferred to the passenger compartment of the vehicle. Because the side rails 12 and 18 are attached to the vehicle frame rail 36 through the cross member 28, the side rails 12 and 18 also begin to move toward the second ends 16 and 22 of the side rails 12 and 18.

As this length shortening occurs, the side rails 12 and 18 begin to bend about the predetermined bending locations 24 and 26 because the cross sectional area defined by the structural notch at the locations 24 and 26 is weaker than the remainder of the respective rails 12 and 18 due to the location and orientation of the bending locations 24 and 26. The side rails 12 and 18 bend in a direction indicated by an arrow 72, best seen in FIG. 3, from the undeformed position shown in FIG. 2 to the deformed position shown in FIG. 3. Because the component 42 is only attached to the carrier 10 intermediate the predetermined bending location 24 and the first end 14 of the first side rail 12 and intermediate the predetermined bending location 26 and the first end 20 of the second side rail 18, as the side rails 12 and 18 bend in the direction 72, the component 42 is lifted in the direction 72 up and away from the second ends 16 and 22 of the side rails 12 and 18. By lifting the component 42 in the direction 72, the component 42 does not interference with the crush of the vehicle frame rail 36, the components 42 itself does not sustain crush, nor does the component 42 interfere with components in the interior of the vehicle, such as a vehicle seat 74, best seen in FIGS. 2–3. The cross member 28 acts as a barrier during a crush event, thus minimizing contact between other components (not shown) that may be attached to the vehicle frame rail 36 rearward of the carrier 10.

The carrier 10 in accordance with the present invention allows the vehicle frame rail 36 to shorten or crush the predetermined distance while absorbing energy during a crush event without requiring a redesign of the vehicle frame rail 36. The side rails 12 and 18 of the carrier 10 act as sacrificial members during a crush event, as the side rails 12 and 18 are deformed while the component 42 remains essentially intact during the crush event. The carrier 10 allows a component 42 to be placed in a vehicle structure, such as the vehicle frame rail 36, and moves the component 42 up and away from the vehicle frame rail during a crush event, allowing the vehicle frame rail 36 to absorb the predetermined amount of energy.

The respective distance between the first ends 14 and 20 and the predetermined bending locations 24 and 26 is determined by the anticipated load to be applied to the cross member 28 and the predetermined crush distance and predetermined amount of energy to be absored by the vehicle frame rail 36. The relative size and/or the shape of the structural notch at the predetermined bending locations 24 and 26 may be selected to bend at a predetermined load applied to the respective first ends 14 and 20 of the side rails 12 and 18. While the carrier 10 has been shown as having a pair of side rails 12 and 18, those skilled in the art will appreciate that more or fewer sacrificial side rails may be a part of the carrier 10 while remaining within the scope of the present invention.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A carrier for use in supporting a component in a vehicle structure, comprising:
    at least a pair of side rails each having a first end and an opposed second end, with said first and second ends attached to the vehicle structure, and with each said side rail including a predetermined bending location at a predetermined location between said first and second ends, said component adapted to be attached to said side rails intermediate said predetermined bending location and said first end, said side rails operable to bend about said predetermined bending location when said vehicle structure crushes between said first ends and said second ends; and
    a cross member extending between said first ends of said side rails.

2. The carrier according to claim 1 wherein said predetermined bending locations are structural notches formed intermediate said first and second ends.

3. The carrier according to claim 2 wherein said structural notches are substantially arcuate in cross section.

4. The carrier according to claim 1 wherein said component is attached to said carrier at at least one mounting location adjacent said first ends of said side rails.

5. The carrier according to claim 1 including at least one vertical support member attached to said cross member.

6. The carrier according to claim 5 including a perimeter rail assembly attached to said side rails intermediate said predetermined bending location and said first end, said perimeter rail assembly adapted to mount the component thereon.

7. The carrier according to claim 6 wherein said perimeter rail assembly includes a first side support having a rearward and a forward end, a second side support having a rearward and a forward end and spaced from the first side support, and a transverse front support connected between the first and seconds side supports adjacent to the forward ends.

8. The carrier according to claim 1 including at least one frame attachment member attached to said cross member.

9. The carrier according to claim 8 including a perimeter rail assembly attached to said side rails intermediate said predetermined bending location and said first end, said perimeter rail assembly adapted to mount the component thereon.

10. The carrier according to claim 9 wherein said perimeter rail assembly includes a first side support having a rearward and a forward end, a second side support having a rearward and a forward end and spaced from the first side support, and a transverse front support connected between the first and seconds side supports adjacent to the forward ends.

11. The carrier according to claim 1 including a perimeter rail assembly attached to said side rails intermediate said predetermined bending location and said first end, said perimeter rail assembly adapted to mount the component thereon.

12. The carrier according to claim 11 wherein said perimeter rail assembly includes a first side support having a rearward and a forward end, a second side support having a rearward and a forward end and spaced from the first side support, and a transverse front support connected between the first and seconds side supports adjacent to the forward ends.

13. The carrier according to claim 1 wherein said opposed ends of said side rails are attached to a vehicle frame rail.

14. A carrier for use in supporting a component in a vehicle structure, comprising:
    at least a pair of side rails each having a first end and an opposed second end, with said first and second ends attached to the vehicle structure, and with each said side rail including a predetermined bending location at a predetermined location between said first and second ends, said component adapted to be attached to said side rails intermediate said predetermined bending location and said first end, said side rails operable to bend about said predetermined bending location when said vehicle structure crushes between said first ends and said second ends; and
    a perimeter rail assembly attached to said side rails intermediate said predetermined bending location and said first end, said perimeter rail assembly adapted to mount the component thereon.

15. The carrier according to claim 14 wherein said predetermined bending locations are structural notches formed intermediate said first and second ends.

16. The carrier according to claim 15 wherein said structural notches are substantially arcuate in cross section.

17. The carrier according to claim 14 wherein said component is attached to said carrier at at least one mounting location adjacent said first ends of said side rails.

18. The carrier according to claim 14 wherein said perimeter rail assembly includes a first side support having a rearward and a forward end, a second side support having a rearward and a forward end and spaced from the first side support, and a transverse front support connected between the first and seconds side supports adjacent to the forward ends.

19. The carrier according to claim 14 wherein said opposed ends of said side rails are attached to a vehicle frame rail.

* * * * *